US006374186B1

(12) United States Patent
Dvorkin et al.

(10) Patent No.: US 6,374,186 B1
(45) Date of Patent: Apr. 16, 2002

(54) METHOD FOR OVERPRESSURE DETECTION FROM COMPRESSIONAL- AND- SHEAR-WAVE DATA

(75) Inventors: Jack Dvorkin, Emerald Hills; Gary Mavko; Amos Nur, both of Stanford, all of CA (US)

(73) Assignee: Petrophysical Consulting, Inc., Emerald Hills, CA (US)

( * ) Notice: Subject to any disclaimer, the term of this patent is extended or adjusted under 35 U.S.C. 154(b) by 0 days.

(21) Appl. No.: 09/534,949

(22) Filed: Mar. 24, 2000

(51) Int. Cl.$^7$ ................................................. G01V 1/28

(52) U.S. Cl. .......................................... 702/18; 367/75

(58) Field of Search .............................. 702/18, 14, 16, 702/12, 13; 367/73, 75

(56) References Cited

U.S. PATENT DOCUMENTS

| | | | | |
|---|---|---|---|---|
| 4,254,479 A | | 3/1981 | Wiley | |
| 4,316,267 A | * | 2/1982 | Ostrander | 367/68 |
| 4,375,090 A | | 2/1983 | Thompson et al. | |
| 4,393,486 A | | 7/1983 | Thompson et al. | |
| 4,398,273 A | | 8/1983 | Thompson et al. | |
| 4,399,525 A | | 8/1983 | Thompson et al. | |
| 4,562,556 A | | 12/1985 | Ingram et al. | |
| 4,599,904 A | * | 7/1986 | Fontenot | 73/783 |
| 4,831,530 A | | 5/1989 | Rai | |
| 4,833,914 A | | 5/1989 | Rasmus | |
| 4,858,200 A | | 8/1989 | Goins | |
| 4,881,209 A | | 11/1989 | Bloomquist et al. | |
| 4,972,384 A | | 11/1990 | Williams | |
| 5,142,500 A | | 8/1992 | Yamamoto et al. | |

OTHER PUBLICATIONS

Berryman, James G., "Long–Wavelength Propagation in Composite Elastic Media 1. Spherical Inclusions", J. Acoustical Society of America, 1980, pp. 1809–1831.

Blangy, Jean–Pierre Dominique, Ph.D., Integrated Seismic Lithologic Interpretation: The Petrophysical Basis: Ph.D. thesis, Stanford University, pp. 1–383, 1992.

Bowers, G. L., "Pore Pressure Estimation From Velocity Data: Accounting for Overpressure Mechanisms Besides Undercompaction", IADC/SPE 27488, pp. 515–529, 1994.

Dvorkin, Jack et al., Identifying Patchy Saturation From Well Logs: Geophysics, vol. 64 No. 6, pp. 1756–1759, 1999.

Gassmann, Fritz et al., 1951, "On Elasticity of Porous Media: Uber die Elastizitat poroser medien: Vierteljahrsschrift der Naturforshenden Gesellschaft in Zurich", pp. 1–23, 1951.

Grauls, D. et al., "Predicting Abnormal Pressure From 2–D Seismic Velocity Modeling", Proceedings OTC Conference, Houston, pp. 525–534, May 1995.

Han, De–Hua, "Effects of Porosity and Clay Content on Acoustic Properties of Sandstones and Unconsolidated Sediments", Ph.D. thesis, Stanford University, 1–210, 1987.

Huffman, Alan R., "The Future of Pressure Prediction Using Geophysical Methods: In Pressure Regimes In Sedimentary Basins and Their Prediction", Conference Proceedings, Houston, 1998.

(List continued on next page.)

Primary Examiner—Donald E. McElheny, Jr.
(74) Attorney, Agent, or Firm—Blakely, Sokoloff, Taylor & Zafman

(57) ABSTRACT

The present invention includes a method for overpressure detection and pore pressure change monitoring in subsurface gas, liquid hydrocarbon, or water reservoirs from compressional- and shear-wave measurement data. As part of this method, one or more Poisson's ratios are determined from field-based measurement data and are then compared against known Poisson's ratio values representative of the particular subsurface formation type. By applying a Poisson's ratio—pore pressure criterion that is appropriate for that type of formation, an overpressure in the formation is identified.

12 Claims, 12 Drawing Sheets

OTHER PUBLICATIONS

Moos, Danie et al, "Predicitng Pore Pressure From Porosity and Velocity: In Pressure Regimes In Sedimentary Basins and Their Prediction", Conference Proceedings, Houston, 1998.

Nur, Amos Michael, "Effects of Stress and Fluid Inclusions On Wave Propagation in Rock", Ph.D. Thesis, MIT, 1969.

Nur, A. et al., "Seismic and Acoustic Velicities in Resevoir Rocks", vol. I, Experimental Studies, SEG Geophysics Reprint Series 10, pp. 270–271, 1989.

Pigott, John D. et al., "Direct Determination of Carbonate Resevoir Porosity and Pressure from AVO Inversion", SEG 60th Annual Int. Meeting, Extended Abstracts, 2, pp. 1533–1536, 1990.

Piggot, John, D. et al., "Direct Determination of Clastic Reservoir Porosity and Pressure from AVO Inversion", SEG 66th Annual Int. Meeting, Extended Abstracts, 2, pp. 1759–1762, 1996.

Rice, James R., et al., "Some Basic Stress Diffusion Solutions For Fluid–Saturated Elastic Porous Media With Compressible Constituents", Reviews of Geophysics and Space Physics, 14, pp. 227–241, 1976.

Strandenes, Sverre, "Rock Physics Analysis of the Brent Group Reservoir in the Oseberg Field", Stanford RockPhysics and Borehole Geophysics Project, 1991.

Toksoz, M. Nafi et al., "Velocities of Seismic Waves in Porous Rocks", Geophysics, 41, pp. 621–645, 1976.

Wang, Zhijing, "Seismic Properties of Carbonate Rocks", Palaz, I., and Marfurt, K., eds., SEG Geophysical Developments Series, 6, pp. 29–52, 1997.

Wyllie, M. R. J., et al., "An Experimental Investigation of Factors Affecting Elastic Wave Velocities in Porous Media", Geophysics vol. XXIII, No. 3, pp. 458–493, 1958.

Yin, Hezhu, "Acoustic Velocity and Attenuation of Rocks: Isotropy, Intrinsic Anisotropy, and Stress Induced Anisotropy", Ph.D. thesis, Stanford University, 1993.

Nur, Amos Micheal, "Effects of Stress and Fluid Inclusions on Wave Propagation in Rock" Ph.D. Thesis MIT, pp. 1–165, 1992.

* cited by examiner $$\text{Velocity, } V = \frac{\text{Wave Travel Length } (\ell)}{\text{Wave Travel Time } (\tau)}$$

US 6,374,186 B1

METHOD FOR OVERPRESSURE DETECTION FROM COMPRESSIONAL- AND- SHEAR-WAVE DATA

BACKGROUND OF THE INVENTION

1. Field of the invention

The present invention relates to a method for overpressure detection and pore pressure changes monitoring. More specifically, the present invention relates to a method for remotely detecting compartments with abnormally high pore pressure (overpressure) in subsurface gas, liquid hydrocarbon, or water reservoirs by combining compressional-wave and shear-wave measurements.

2. Description of Related Art

The compressional-wave (P-wave) and shear-wave (S-wave) acoustic data are generally used to obtain information regarding the presence of hydrocarbons in subsurface geological formations, as well as to obtain information concerning such subsurface formation properties as porosity, lithology (i.e., the character of a rock formation), formation fluid, and formation mechanical properties.

Identifying the compressional-wave and measuring its velocity is generally not difficult to carry out. In borehole logging, for example, the compressional-wave is the fastest propagating wave in the formation, it is non-dispersive, and is the first to reach borehole receivers. By measuring the arrival times of these waves at the receivers, the wave velocity near the array of receivers can be determined. In contrast, a shear-wave may have lower amplitude and higher noise level than a compressional-wave. Because it propagates more slowly through the formation, the shear wave arrives later in time and may be obscured by compressional energy. Identifying a shear-wave and measuring its velocity is considerably more difficult.

When compressional-wave velocity and shear-wave velocity ($V_p$ and $V_s$, respectively) information is available from field measurements, the ratio of compressional-wave velocity to shear-wave velocity ($V_p/V_s$) may provide valuable additional information. Prior art techniques have also used the ratio $V_p/V_s$ to identify hydrocarbon-bearing zones and formations.

The traditional method of estimating overpressure in subsurface gas, liquid hydrocarbon, and water reservoirs is to look for abnormally low compressional-wave velocity since low compressional-wave velocity typically corresponds to low differential pressure (where differential pressure is the confining pressure minus the pore pressure) and/or abnormally high porosity. Thus, the effect of compressional-wave velocity decreasing with increasing pore pressure is used to detect for overpressure.

However, methods that use compressional-wave velocity information for overpressure detection are not very accurate or reliable. Compressional-wave velocity does not uniquely indicate pore pressure because compressional-wave velocity also depends, among other factors, on porosity, mineralogy, pore fluid, and texture of the rock. For example, as illustrated in FIGS. 1a and 1b, laboratory experiments on rock data collected from the North Sea and Gulf of Mexico indicate that at the same differential pressure of 20 MPa and in the same porosity range, compressional-wave velocity in gas-saturated Gulf of Mexico sandstones (gray symbols) is smaller than that in dry-room North Sea sandstones (black circles), mostly due to textural differences (see FIG. 1a). At the same time, data indicate that compressional-wave velocity in the Gulf of Mexico sandstones at 20 MPa is about the same as in the overpressured (5 MPa differential pressure) North Sea sandstones (see FIG. 1b). The low compressional-wave velocity in the Gulf of Mexico sandstone group may be mistakenly attributed to overpressure.

More recent methods for overpressure detection have used compressional-wave velocity and density or porosity data, and then employed shear-wave velocity to correct for fluid effects. However, these methods still are not unique and thus not very accurate for compartment overpressure detection because they do not take into account velocity variations due to rock texture and porosity.

Although some methods have used the ratio of compressional-wave to shear-wave velocity ($V_p/V_s$) or the Poisson's ratio (an elastic constant based on $V_p/V_s$ ratio) to identify hydrocarbon-bearing zones or to provide an estimate of the character of the rock formation, none of these methods have used the $V_p/V_s$ ratio or the Poisson's ratio as an overpressure indicator.

It is desirable to develop a reliable and unique method for overpressure detection from compressional-wave and shear-wave data. It is also highly desirable to provide a simple method for remotely detecting compartments with abnormally high pore pressure (overpressure) in subsurface gas, liquid hydrocarbon, or water reservoirs. It is further desirable to provide a method for improving the safety of on-land and offshore drilling operations by detecting or predicting abnormally high pressure in advance of a drilling operation.

SUMMARY OF THE INVENTION

The present invention describes a method for identifying overpressure in a subsurface formation, wherein a Poisson's ratio or a $V_p/V_s$ ratio for the subsurface formation is first determined from compressional-wave measurement and shear-wave measurement. Comparing the determined Poisson's ratio (or $V_p/V_s$ ratio) value with a plurality of known Poisson's ratio (or a plurality of known $V_p/V_s$ ratio) values representative of the subsurface formation permits an overpressure to be identified in the subsurface formation.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures:

FIG. 13a is a cross-plot of theoretical bulk and shear moduli versus crack porosity for sandstone sample of FIG. 5, calculated in accordance with the method of the present invention. FIG. 13b is a cross-plot of theoretical Poisson's ratio versus crack porosity for sandstone sample of FIG. 5, calculated in accordance with the method of the present invention. FIG. 13c is a cross-plot of experimental bulk moduli versus differential pressure for sandstone sample of FIG. 5. FIG. 13d is a cross-plot of experimental Poisson's ratio versus differential pressure for sandstone sample of FIG. 5. Increasing crack porosity corresponds to decreasing differential or increasing pore pressure.

DETAILED DESCRIPTION OF THE INVENTION

An improved method for overpressure detection in subsurface gas, liquid hydrocarbon, or water reservoirs is described. In the following description, numerous specific details are set forth such as specific sandstone and rock formations, formation characteristics, parameters, processes, etc. in order to provide a thorough understanding of the present invention. It will be apparent, however, to one skilled in the art that these specific details need not be employed to practice the present invention. In other instances, well known materials, properties, or methods have not been described in detail to avoid unnecessarily obscuring the present invention.

The present invention may be employed in a number of overpressure detection processes. The present invention applies to reservoirs with secondary pore pressure development mechanisms among which are: (a) aquathermal fluid expansion; (b) hydrocarbon source maturation and fluid expansion; (c) clay diagenesis; (d) fluid pumping from deeper pressured intervals; and (e) decrease in overburden due to tectonic activity. Furthermore, the present invention applies to gas-saturated rock formations, liquid-saturated rock formations, or a combination thereof.

In another embodiment of this invention, the overpressure detection method is used for monitoring the spatial and temporal location of fluids (gases and/or liquids) injected at pressure into (or pumped out from) subsurface formation. Examples of injected fluids include (1) natural gas and $CO_2$ used for enhanced recovery; (2) water used for enhanced recovery; (3) excessive $CO_2$ sequestrated by injecting into the subsurface; (4) fluids with drill cuttings injected into the subsurface with the purpose of sequestration.

The present invention includes a method for overpressure detection in subsurface gas, liquid hydrocarbon, or water reservoirs from compressional- and shear-wave velocity measurement data. The compressional- and shear-wave data can be obtained from well known geophysical measurement technology and methods, including (but not limited to) for example, surface and marine (bottom cables) seismic reflection profiling, well log velocity measurements, cross-well measurements, vertical seismic profiling, and velocity measurements ahead of the drill bit.

Figure 1A:
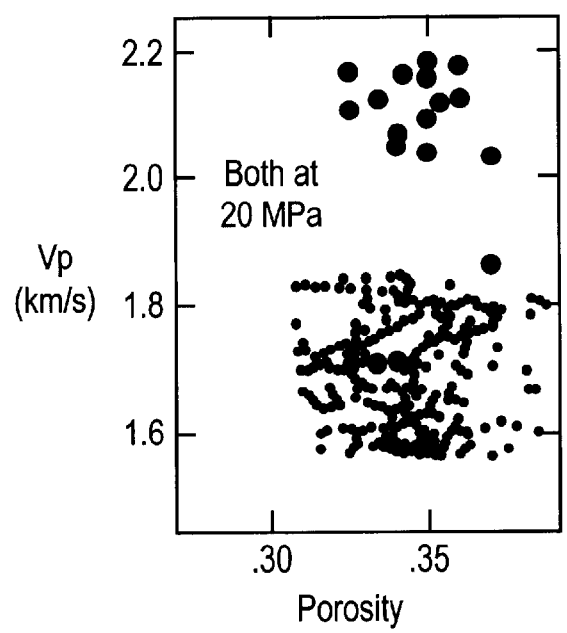
FIGS. 1a–1b are cross-plots of compressional-wave velocity versus porosity for North Sea sandstones and Gulf of Mexico sandstones—with gas.
Figure 1B:
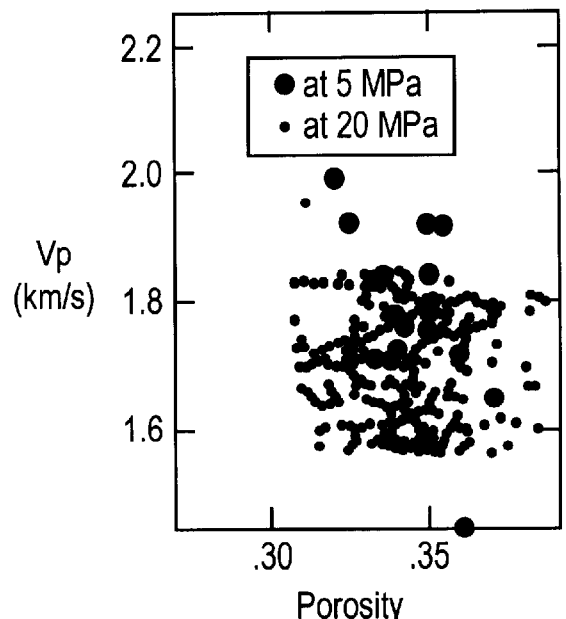
Figure 2:
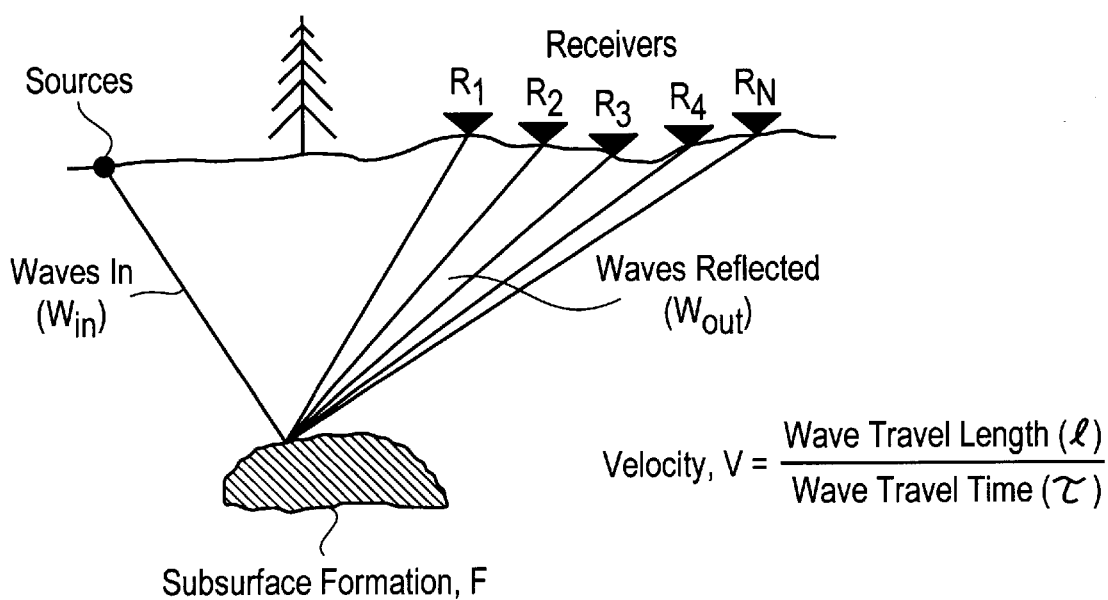
FIG. 2 illustrates a seismic reflection profiling system employed to measure elastic-wave velocity reflected from subsurface formations.

FIG. 2 illustrates a source and an array of receivers that are part of a seismic reflection profiling system typically used in land seismic surveying. It should be noted that analogous system configurations are used for marine seismic surveying and that the present invention is applicable to, and can be used with other acoustic wave data gathering systems. The seismic reflection profiling system includes one or more acoustic sources $S_1 \ldots S_n$ generating multiple acoustic waves $W_{in}$. Once the incoming waves $W_{in}$ reach the subsurface formation F that includes the overpressured compartment C, they are reflected off the formation F as outgoing waves $W_{out}$. The reflected waves $W_{out}$ are then received by receivers $R_1 \ldots R_n$ and are recorded. Using current geophysical measurement and data processing technology, compressional-wave and shear-wave information (including times for the wave to travel from source to the array of receivers, distance or length traveled by waves) are measured and/or extracted from reflected wave $W_{out}$ data. The wave information measured or extracted is then used to calculate compressional-wave velocity ($V_p$) and shear-wave velocity ($V_s$). Velocity is, in principle, calculated as being the wave travel length, L, divided by wave travel time, T, for each type of wave measured (or extracted). Various techniques and systems well known in the art can be used for transmitting, collecting, and analyzing compressional- and shear-wave information.

Figure 3:
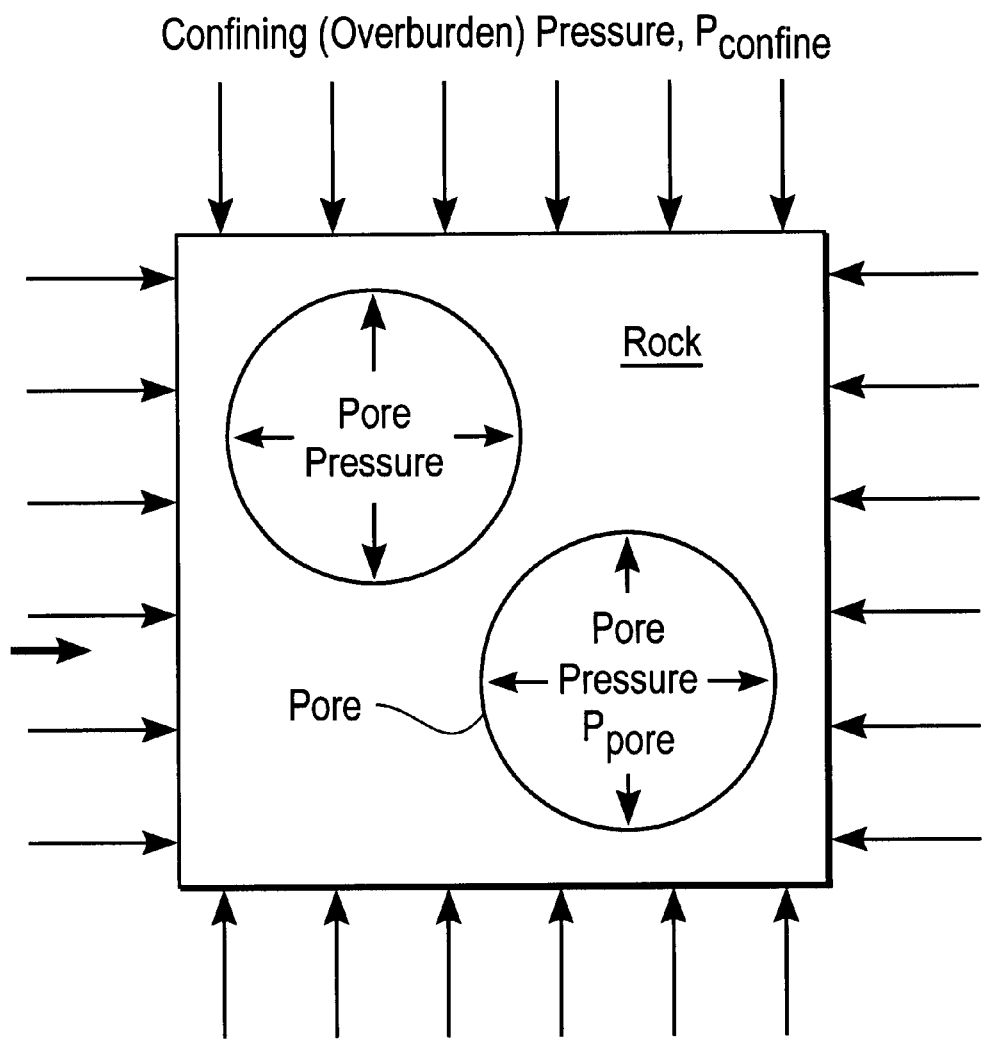
FIG. 3 illustrates a schematic detail of a typical sandstone formation.

The subsurface formation F, which could be a subsurface gas, liquid hydrocarbon, or water reservoir, has an internal pore pressure $P_{pore}$ and is subject to a confining (overburden) pressure, $P_{confine}$ (see FIG. 3). The differential pressure, $P_{differential}$, is calculated using Eqn. 1:

$$P_{differential} = P_{confine} - P_{pore} \quad (1)$$

Figure 4:
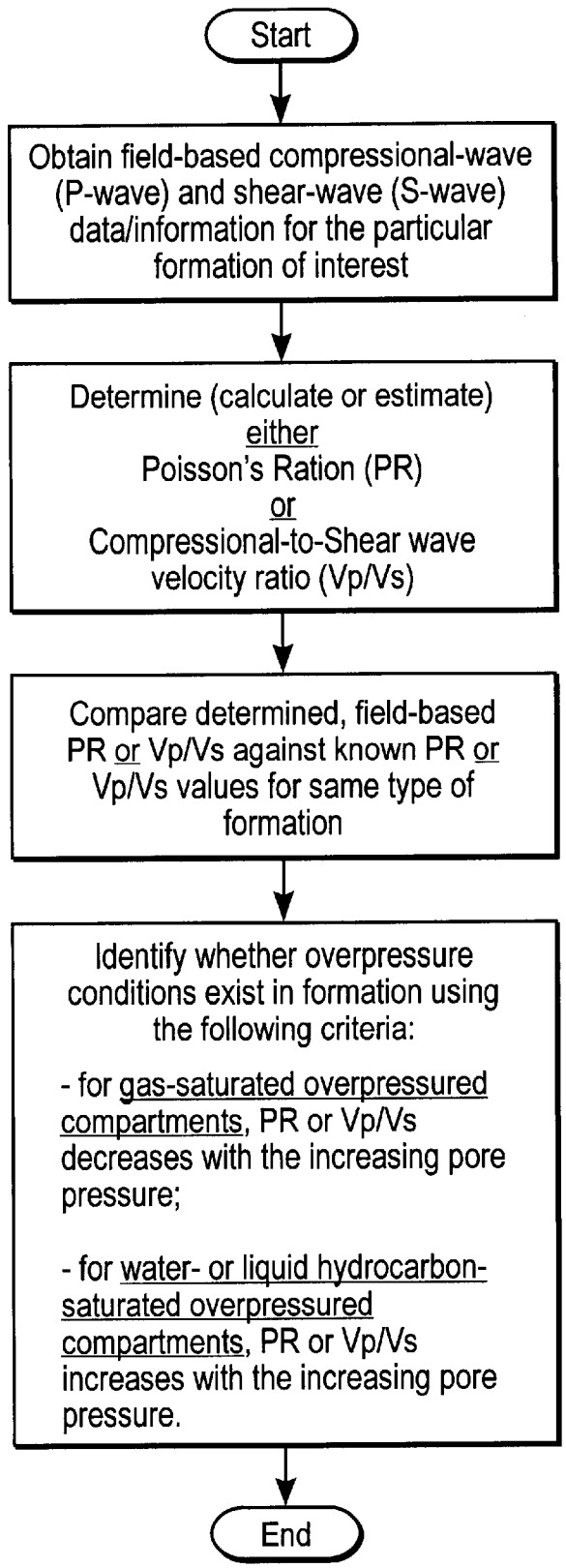
FIG. 4 illustrates a flow chart of one embodiment of the present invention.

Referring to FIG. 4, the method of this invention uses both compressional-wave velocity ($V_p$) and shear-wave velocity ($V_s$) measurements obtained as part of step 110 and combines these data to calculate either the ratio of these velocities ($V_p/V_s$) or the Poisson's ratio (step 120 in FIG. 4). Poisson's ratio PR is calculated using the relationship presented in Eqn. 2:

$$PR = 0.5 \{[(V_p/V_s)^2 - 2]/[(V_p/V_s)^2 - 1]\} \quad (2)$$

It should be noted that Poisson's ratio or compressional-to-shear wave velocity ratio $V_p/V_s$ can either be calculated by remotely measuring $V_p$ and $V_s$ or they may be estimated (without directly measuring $V_p$ and $V_s$) by using techniques well known in the art, such as the "Amplitude Versus Offset" (AVO) method or "Elastic Impedance" (EI) method.

The "Amplitude Versus Offset" (AVO) method employs the reflected P-wave amplitude changes versus the angle of incidence (or offset at the surface) of this wave upon the boundary between two sedimentary layers that are elastically different (e.g., overlaying shale layer and underlying gas sand). This amplitude change depends on the Poisson's ratio contrast between the layers. Therefore, by employing basic physics laws, one can interpret this changing reflection amplitude in terms of Poisson's ratio values of the target rock formation.

The "Elastic Impedance" (EI) method is a method of calculating Poisson's Ratio (PR) or related S-wave elastic properties of the rock from P-wave reflection signals that are recorded from the wave propagating at a non-zero incidence angle to the target formation boundary. The reflection signals at an angle are related to the PR contrast between different earth layers. In other words, they depend on the spatial derivative of the PR in the subsurface. The EI method uses seismic signal inversion that is mathematically similar to integrating the reflection signal in order to arrive at the absolute (not contrast) values of PR (or $V_p/V_s$) in rock.

Proceeding to step 130, the value of the field-based Poisson's ratio (or the velocity ratio) determined (i.e., calculated or estimated) during step 120 is then compared to previously known (or laboratory-estimated) values of Poisson's ratio or velocity ratio for that particular type of formation (with its characteristics, such as porosity, clay content, etc.). It should be noted that values of Poisson's ratio for an array of differential pressures ranging from zero MPa to about 60 MPa have previously been determined and are known for various types of rock formations (e.g., Berea sandstone with 19% porosity). Examples of these known values of Poisson's ratio for various types of rock formations at a range of differential pressures are presented in FIGS. 8a–8l. Poisson's ratio values for other types of rock formations than those presented in FIGS. 8a–8l are well known to those skilled in the art of geophysical measurement.

Proceeding to step 140 (and following Poisson's ratio comparison step), the method of this invention then identifies whether overpressure conditions exist in the formation by evaluating the behavior of the field-based Poisson's ratio (or the velocity ratio) value determined in Step 130 and using the following criteria:

a) In gas-saturated overpressured compartments (that are part of formation F), the Poisson's ratio (or $V_p/V_s$ ratio) decreases with the increasing pore pressure. This method will detect overpressured compartments C by assigning their location to a location designated as having an abnormally low Poisson's ratio (on a cross-plot of PR values differential pressure, for example).

b) For liquid hydrocarbon-saturated and water-saturated compartments (that are part of formation F), the Poisson's ratio (or $V_p/V_s$ ratio) increases with the increasing pore pressure. This method will detect overpressured compartments C by assigning their location to a location designated as having an abnormally high Poisson's ratio (on a cross-plot of PR versus differential pressure, for example).

As part of practicing the method of this invention, steps 110 to 140 may each be performed a single time or they may be repeated multiple times for the same particular formation F.

To further understand the method of the invention, and in particular step 140 of FIG. 4 (i.e., criteria developed by this invention to allow identification of overpressured compartments based on the effect of pore pressure on the Poisson's ratio behavior), a brief discussion is presented below.

Figure 5:
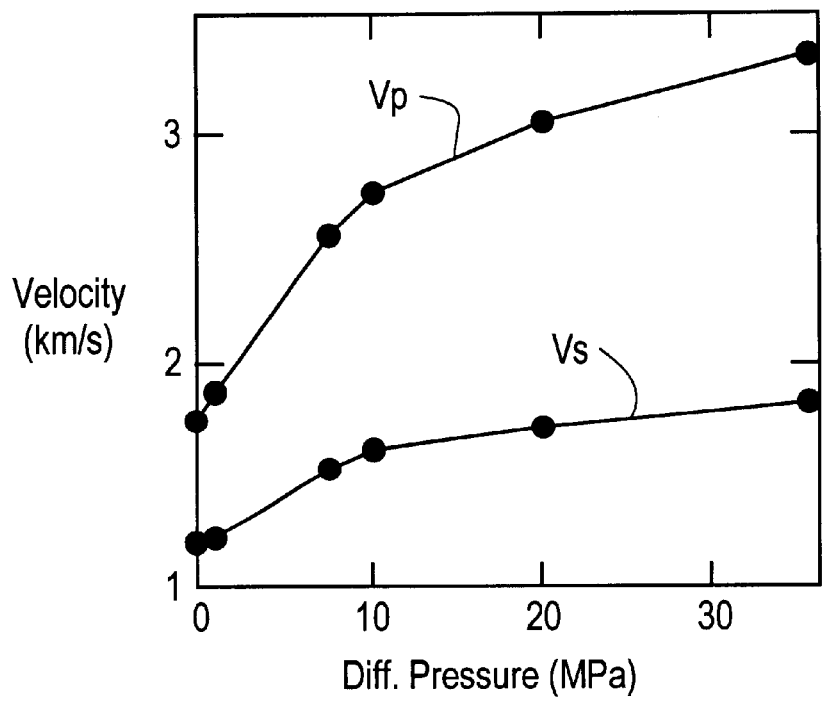
FIG. 5 is a cross-plot of velocity versus differential pressure in ultrasonic laboratory experiments on room-dry clay-free sandstone sample of 18% porosity.
Figure 6:
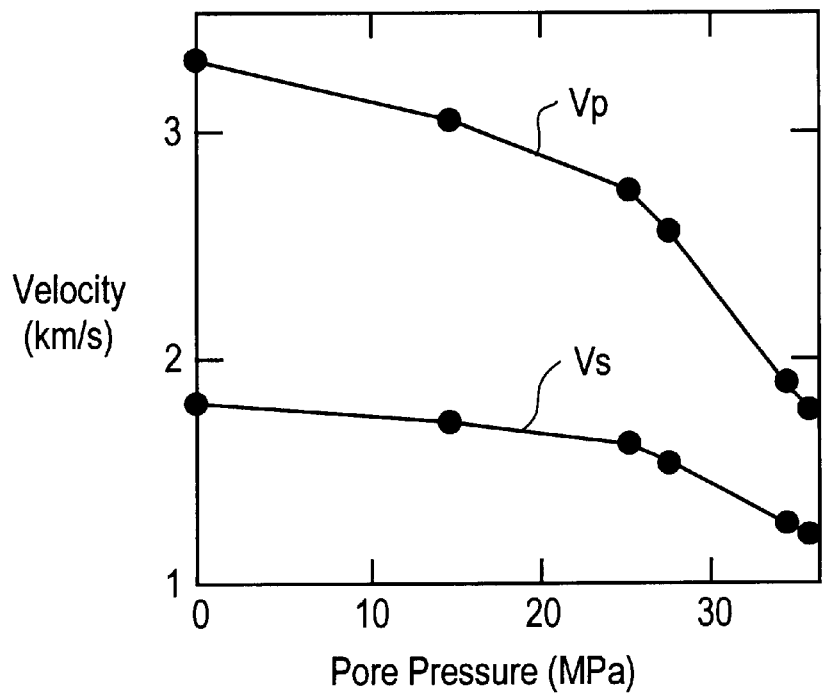
FIG. 6 is a cross-plot of the same velocity data as presented in FIG. 4 where data are re-plotted versus (fictitious) pore pressure assuming that the overburden pressure is 35 MPa and differential pressure changes due to changing pore pressure.

Typically, elastic-wave velocity in dry-rock is measured in a laboratory environment by varying confining pressure $P_{confine}$ while maintaining constant pore pressure, $P_{pore}$. Because velocity reacts to the differential pressure (i.e., confining pressure minus pore pressure, as presented in Eqn. 1), such data can immediately be used to predict in-situ velocity variations in rock with gas due to pore pressure changes at constant overburden. An example is illustrated in FIG. 5, which represents a cross-plot of compressional-wave velocity $V_p$ and shear-wave velocity $V_s$ versus differential pressure in ultrasonic laboratory experiments on room-dry clay-free sandstone sample of 18% porosity. FIG. 6 represents the data of FIG. 5 re-plotted versus (fictitious) pore pressure assuming that the overburden is 35 MPa and differential pressure changes due to changing pore pressure. Velocity at in-situ saturation conditions can be calculated from the dry-rock velocity using fluid substitution equations. Due to the large compressibility of gas, the in-situ velocity in gas-saturated rock is very close to that in air-saturated rock in the laboratory at the same differential pressure.

Figure 7A:
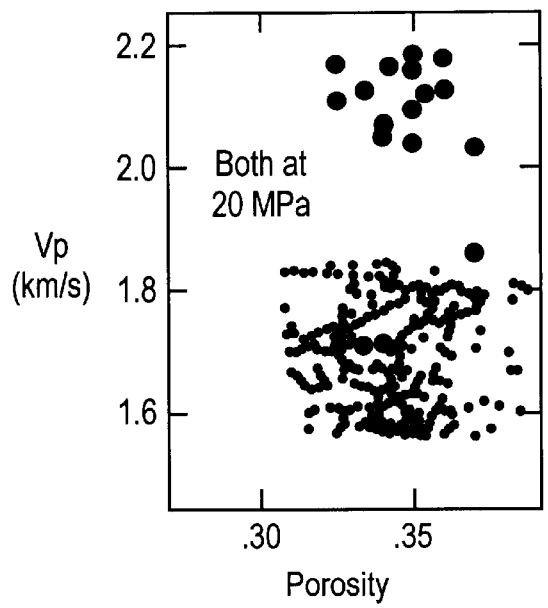
FIGS. 7a–7d are cross-plots of compressional-wave velocity versus porosity (FIGS. 7a and 7b) and Poisson's ratio versus porosity (FIGS. 7c and 7d) for North Sea sandstones and Gulf of Mexico sandstones with gas.
Figure 7B:
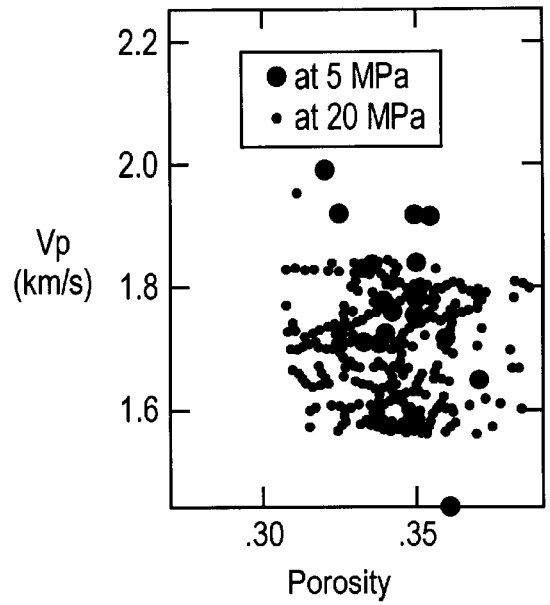

As stated above, the effect of compressional-wave velocity $V_p$ decreasing with increasing pore pressure $P_{pore}$ has been used for overpressure detection. However, compressional-wave velocity does not uniquely indicate pore pressure because it also depends, among other factors, on porosity, mineralogy, pore fluid, and texture of rock. An example is illustrated in FIG. 7a where, at the same time differential pressure of 20 MPa and in the same porosity range, compressional-wave velocity in gas-saturated Gulf of Mexico sandstones (gray symbols) is smaller than that in dry-room North Sea sandstones (black circles), apparently due to textural differences. At the same time, compressional-wave velocity in Gulf sandstones at 20 MPa is about the same as in the overpressured (5 MPa differential pressure) North-Sea sandstones (FIG. 7b). The low velocity in the former sandstone group may be mistakenly attributed to overpressure.

Figure 7C:
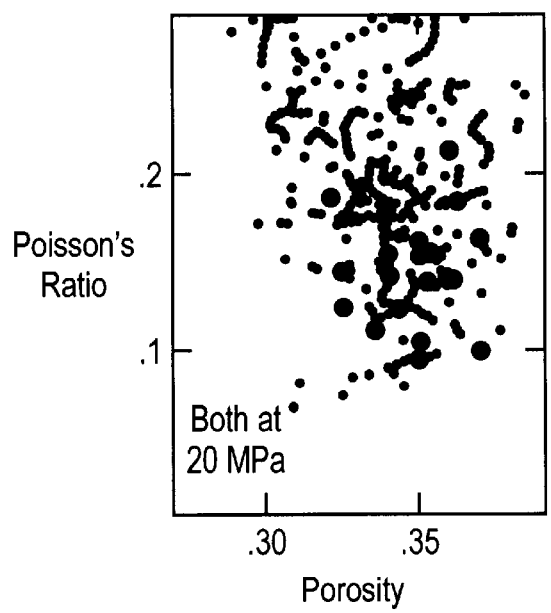
Figure 7D:
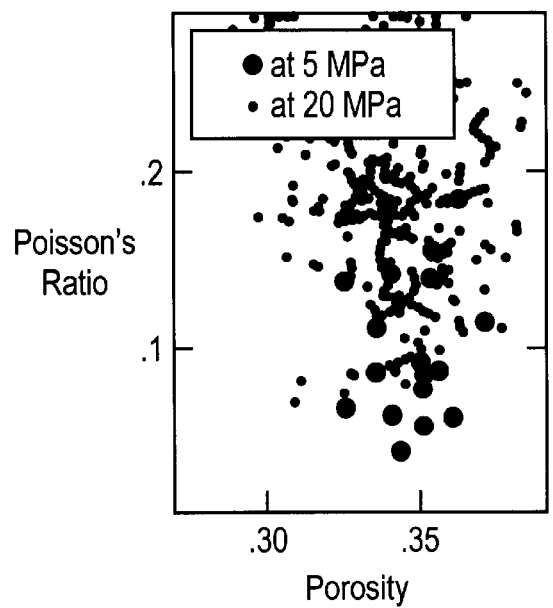

The method of this invention resolves this ambiguity and improves the reliability of overpressure detection by using the Poisson's ratio (PR) determined from compressional-wave (P-wave) and shear-wave (S-wave) velocity as an overpressure indicator. In the above example, Poisson's ratio uniquely reacts to pressure changes. This behavior is further illustrated in FIG. 7c, where although the Poisson's ratios of the two sandstone groups are in the same range at 20 MPa differential pressure, their velocity ranges are different. At the same time, as shown in FIG. 7d, where the data for a Gulf of Mexico sandstone group (gray symbols) are at 20 MPa and the data for a North Sea sandstone group (black circles) are at 5 MPa, their Poisson's ratio ranges are different while their velocity ranges are the same. Therefore, Poisson's ratio in the North Sea sandstones decreases with decreasing differential pressure (increasing pore pressure at constant overburden). This Poisson's ratio-pressure effect persists in many types of sandstone as well as in other rock types and its use provides a novel way for overpressure prediction.

Figure 8A:
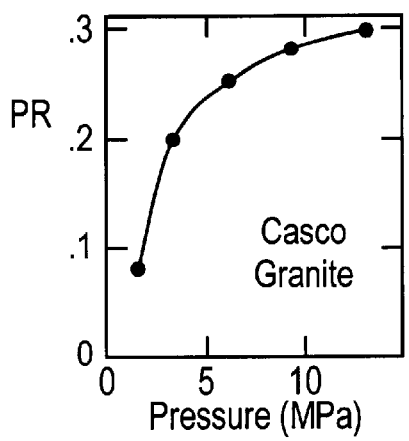
FIGS. 8a–8l are cross-plots of Poisson's ratio versus differential pressure in room-dry samples for various sandstone or rock formation types.
Figure 8B:
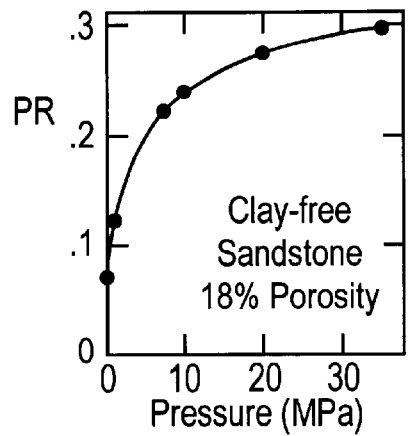
Figure 8C:
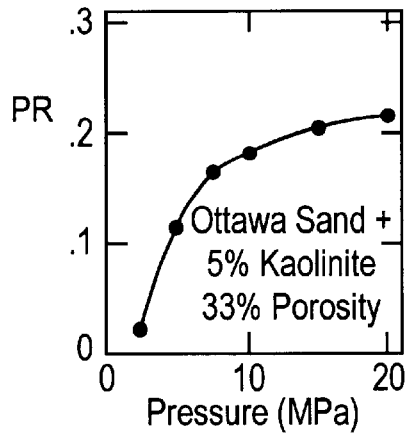
Figure 8D:
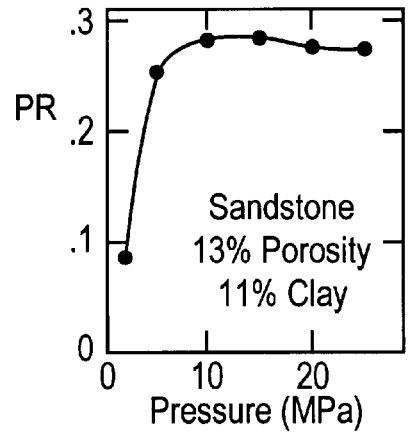
Figure 8E:
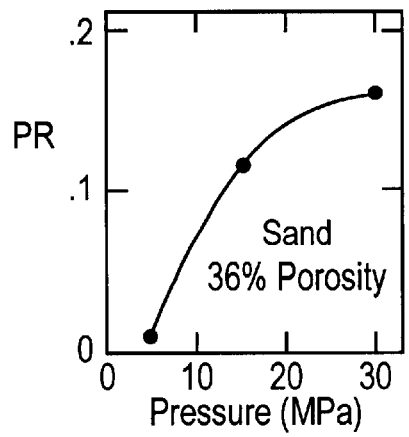
Figure 8F:
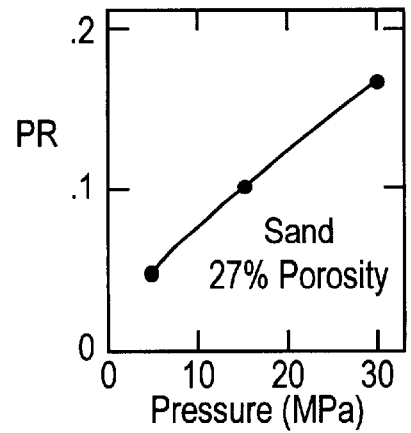
Figure 8G:
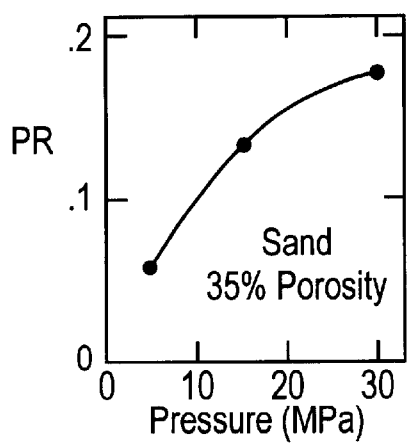
Figure 8H:
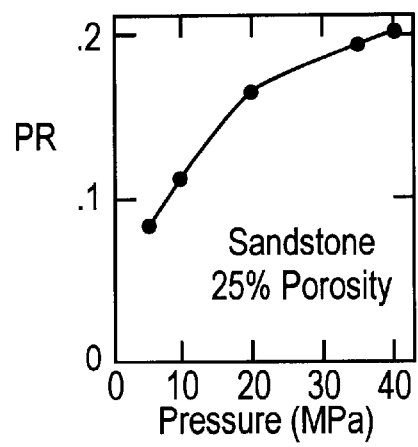
Figure 8I:
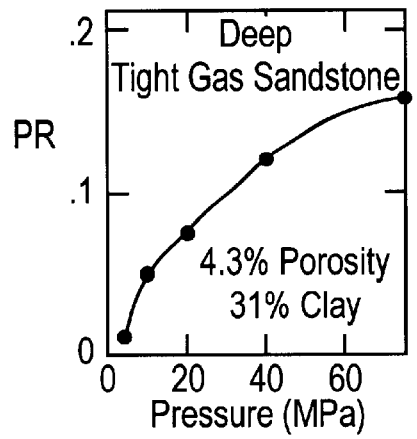
Figure 8J:
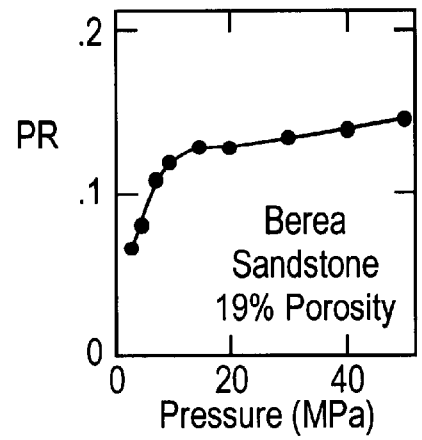
Figure 8K:
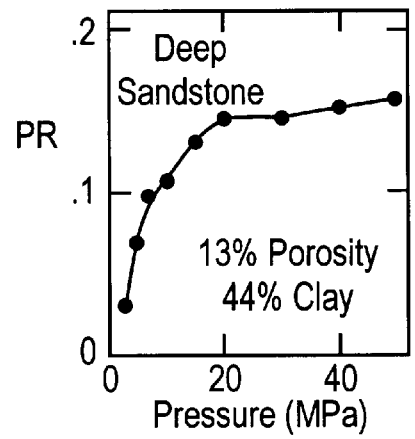
Figure 8L:
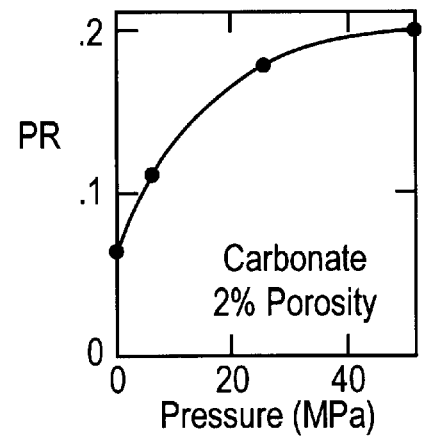

The decrease of Poisson's ratio with decreasing differential pressure in room-dry granite and dolomite samples has been recorded as early as 1969 (see FIG. 8a). Other studies have also presented this effect of Poisson's ratio decreasing with decreasing differential pressure effect, however, these studies had proposed to use Poisson's ratio to identify saturating fluids. More recent studies have shown that the $V_p/V_s$ ratio in gas-saturated rocks increases with increasing differential pressure. This statement has been supported by velocity measurements in carbonate and other rock-type samples performed in laboratory environment.

The effect of a decrease of Poisson's ratio with decreasing differential pressure seems to be general and has been observed in many room-dry sandstone and sand samples. Data from some of these samples are presented in cross-plots shown in FIGS. 8b–8l, where the porosity ranges between zero and 40% and the clay content ranges between zero and 45%. As clearly shown in FIGS. 8b–8l, although the compressional-wave velocity varies significantly among these samples, Poisson's ratio invariably decreases with decreasing differential pressure.

Figure 9:
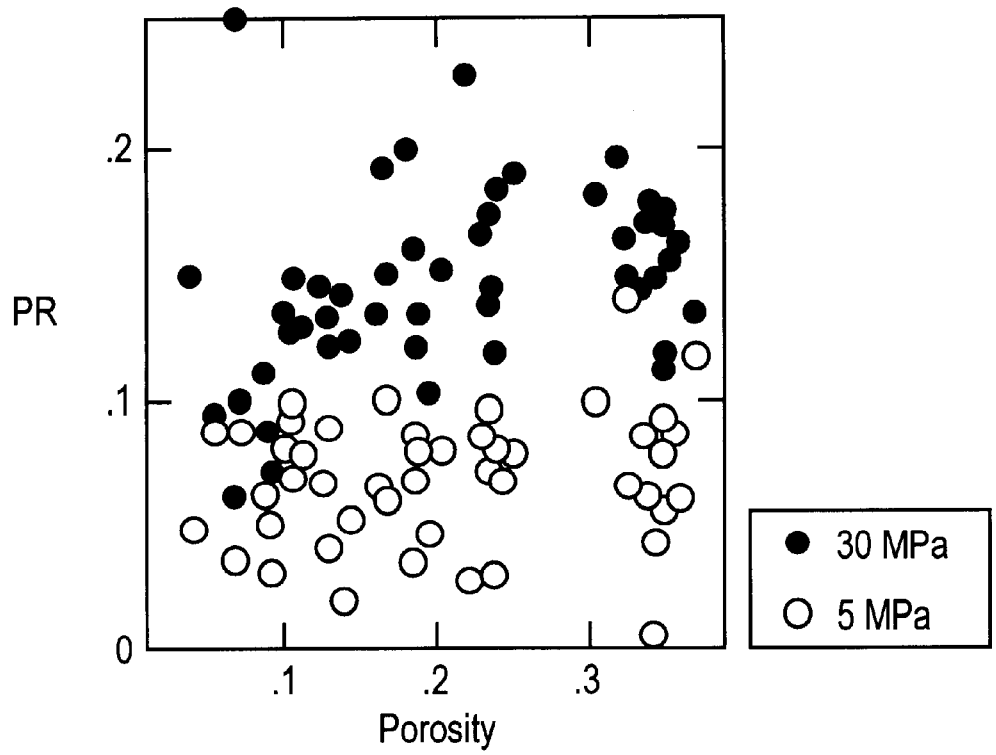
FIG. 9 is a cross-plot of Poisson's ratio versus porosity for data collected on approximately 50 room-dry sandstone samples.
Figure 10:
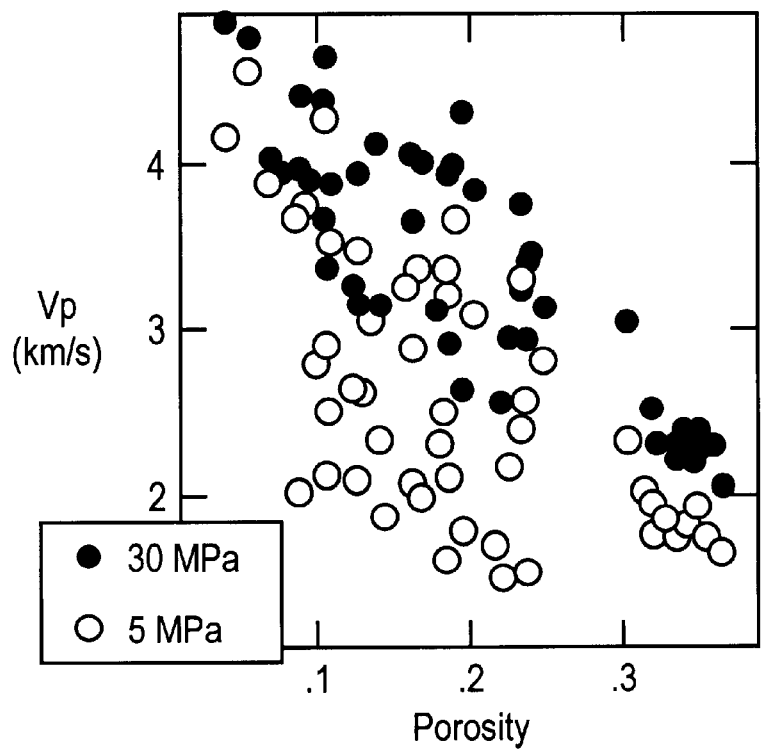
FIG. 10 is a cross-plot of compressional-wave velocity versus porosity for data collected on approximately 50 room-dry sandstone samples.
Figure 11:
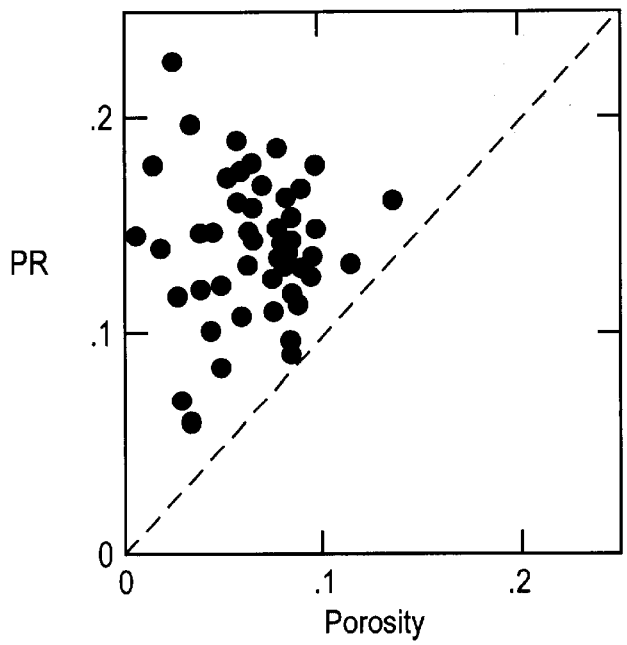
FIG. 11 is a cross-plot of Poisson's ratio at 30 MPa versus Poisson's ratio at 5 MPa for data collected on approximately 50 room-dry sandstone samples.

Data collected on about 50 sandstone samples are summarized in FIG. 9 where dry-rock Poisson's ratios at 30 MPa differential pressure (illustrated as filled symbols) and 5 MPa differential pressure (illustrated as open symbols) are plotted versus porosity. The ranges of the low-pressure and high-pressure Poisson's ratio do not overlap. At the same time, data in FIG. 10 show that depending on porosity, mineralogy, and texture, the low-pressure velocity in some samples may be in the same range as the high-pressure velocity in others. The Poisson's ratio-pressure effect is highlighted in FIG. 10 where the 30 MPa data are plotted versus the 5 MPa data. The former are invariably larger than the latter.

Figure 12:
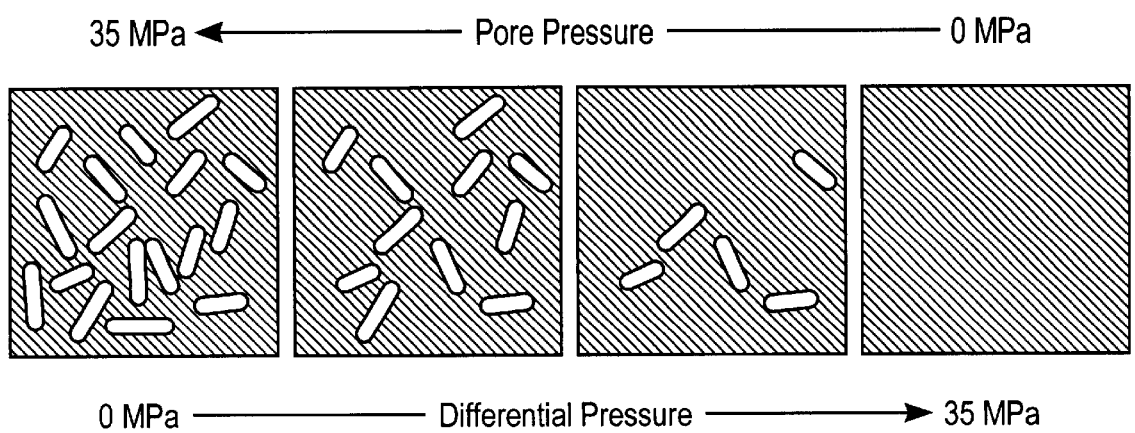
FIG. 12 illustrates rock crack opening and closure as pressure changes in room-dry sandstone sample of FIG. 5, calculated in accordance with the method of the present invention.

The observed effect of Poisson's ratio decreasing with decreasing differential pressure can also be theoretically modeled and explained as follows. First, it is assumed that the observed velocity and elastic moduli variation versus pressure are due to the closure (as pressure increases) and opening (as pressure decreases) of compliant thin crack in the rock. Next, the effect of pressure on elastic moduli in the sandstone sample used in FIGS. 5 and 6 (i.e., room-dry clay free sandstone sample of 18% porosity) is numerically simulated by assuming that the porosity occupied by thin cracks of 0.001 aspect ratio decreases from 1% at zero differential pressure to zero percent at 35 MPa (see FIG. 12). An elastic body whose bulk modulus and shear modulus are the same as of the sample selected at 35 MPa is then introduced and populated with cracks, gradually increasing the crack porosity from zero to 1%. The effective medium theory used to calculate the elastic moduli of the body with cracks is the self-consistent approximation of Berryman (Berryman, J. G., "Long-wavelength propagation in composite elastic media, I and II, J. Acoust. Soc. Amer., Vol. 68, pp. 809–1831 (1980)). Other inclusion-based effective medium theories may be used for this modeling purpose as well. Mathematical expressions to calculate bulk, compressional, and shear moduli, as well as compressional-wave and shear-wave velocities are well known in the art.

Figure 13A:
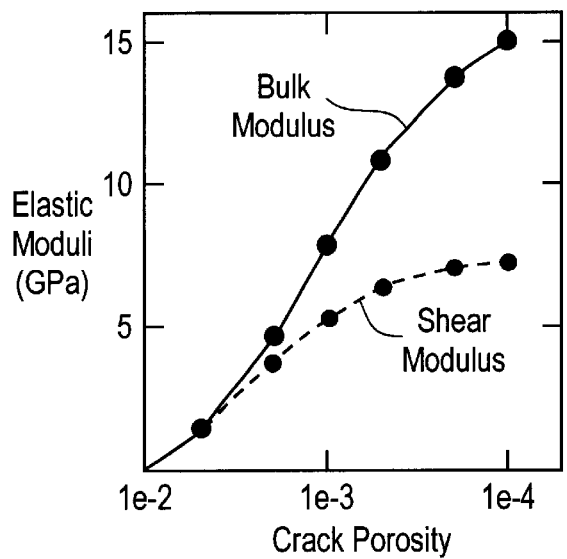
FIGS. 13a–13d illustrate the pressure effect on the elastic moduli of room-dry sandstone sample of FIG. 5.
Figure 13C:
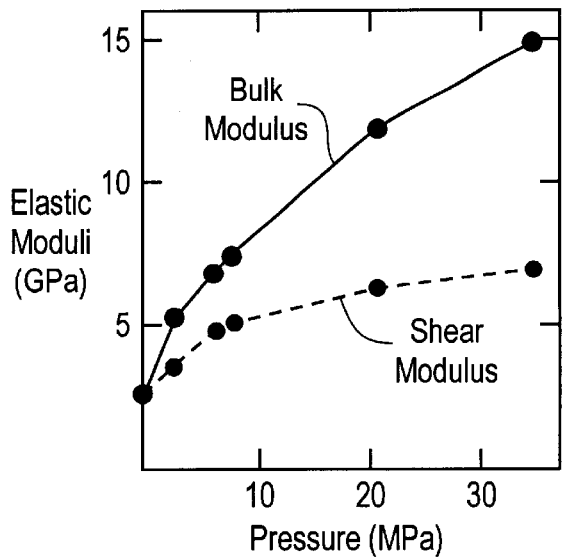
Figure 13B:
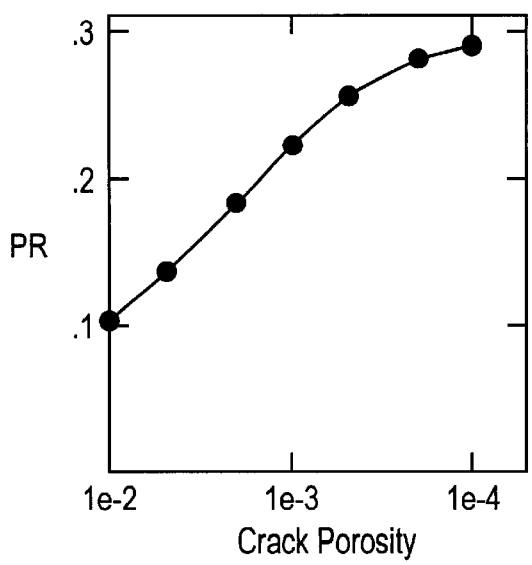
Figure 13D:
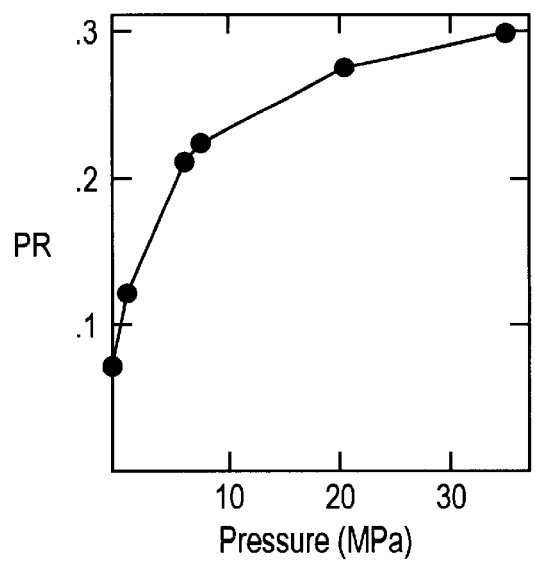

The modeling results conducted on a room-dry clay free sandstone sample of 18% porosity are shown in FIGS. 13a–13d. FIG. 13a illustrates cross-plots of theoretical bulk modulus and shear modulus versus crack porosity, while FIG. 13b illustrates a cross-plot of theoretical Poisson's ratio versus crack porosity. FIG. 13c illustrates cross-plots of experimental bulk modulus and shear modulus versus differential pressure, while FIG. 13d illustrates a cross-plot of experimental Poisson's ratio versus differential pressure.

The modeling results shown in FIGS. 13a–13d not only qualitatively but also quantitatively mimic the laboratory data. The modeling presented above is consistent with the observed effect of pressure on Poisson's ratio. The theoretical explanation of the effect of pressure on Poisson's ratio is valid for many granular rocks where compliant grain contacts resemble thin cracks and compliant cracks may be present within the grains. The method of this invention uses the information presented above to develop the criteria presented in step 140 of FIG. 4 for identification of overpressure conditions in the formation.

As part of another example modeling the pressure effect on the dry-rock and rock-with-water Poisson's ratio (PR) in a calcite sample, it is assumed that the sample at high differential pressure is calcite of 15% porosity and the pores are spherical and filled with high-compressibility gas. Using the self-consistent approximation of Berryman, it is determined that the PR of this sample is 0.29. Next, it is assumed that the sample's porosity at low pressure is 16% and the additional 1% is due to thin cracks of 0.001 aspect ratio. By varying the crack porosity from zero (at high pressure) to 1% (at low pressure), the effect of pressure on PR is modeled as shown in FIG. 14 (see curve labeled "Dry" in FIG. 14).

For a water-saturated calcite sample, Gassmann's equations (Gassmann, F., "Elasticity of Porous Media: Uber die elastizitat poroser medien: Vierteljahrsschrift der Naturforschended Gesselschaft, Vol. 96, pp. 1–23 (1951)) are used to calculate the Poisson's ratio for the sample where bulk modulus of the water is 2.5 GPa. Other pore-filling liquids (e.g., oil or gas condensate) will produce a similar effect.

Figure 14:
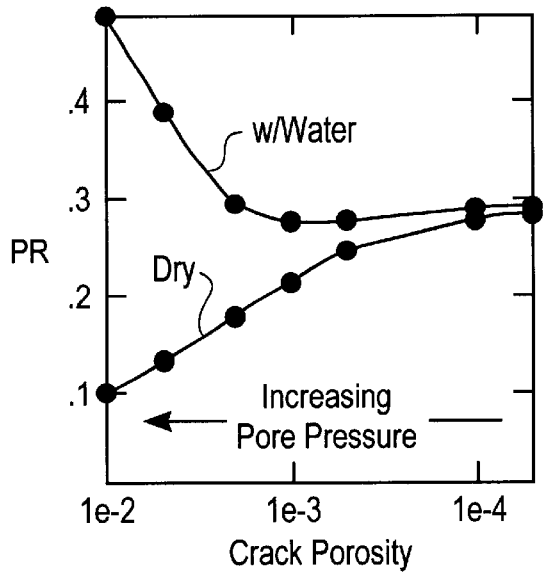
FIG. 14 is a cross-plot of Poisson's ratio versus crack porosity in a synthetic calcite sample, calculated in accordance with the method of the present invention. Increasing crack porosity corresponds to decreasing differential or increasing pore pressure.

It is important to note that while the dry-rock PR decreases with increasing crack porosity (increasing pore pressure), the saturated-rock PR shows the opposite trend (see curve labeled "w/Water" in FIG. 14). It should be kept in mind that higher crack porosity corresponds to low differential pressure or high pore pressure. The method of this invention uses the information presented above to develop the criteria presented in step 140 of FIG. 4 for identification of overpressure conditions in dry-rock, rock-with-water, and rock-with-liquid-hydrocarbon formations.

Figure 15:
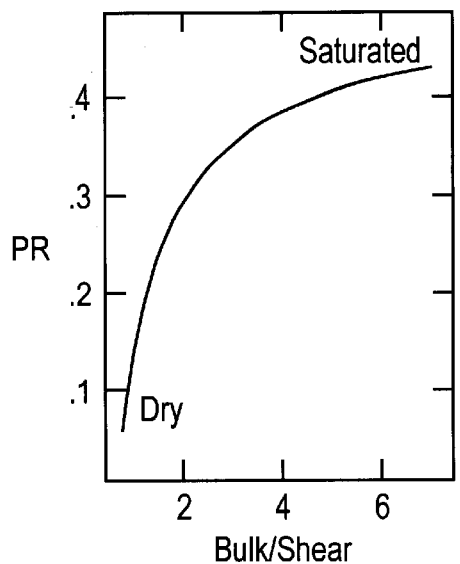
FIG. 15 is a cross-plot of Poisson's ratio versus bulk-to-shear modulus ratio in a synthetic calcite sample, calculated in accordance with the method of the present invention.
Figure 16:
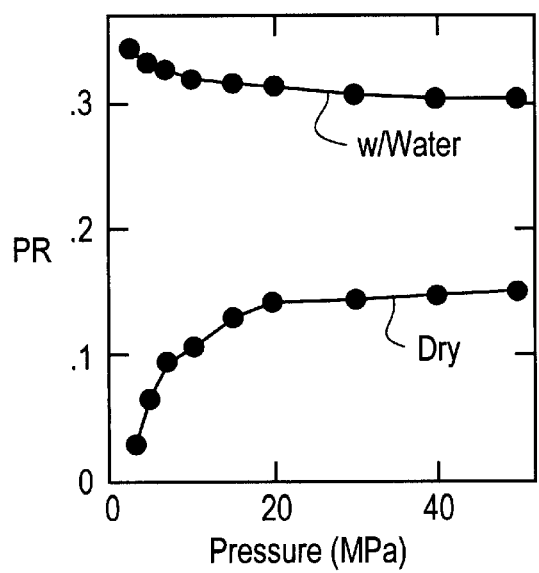
FIG. 16 is a cross-plot of Poisson's ratio in dry and water-saturated samples versus differential pressures for sandstone sample of FIG. 8k, calculated in accordance with the method of the present invention.
Figure 17:
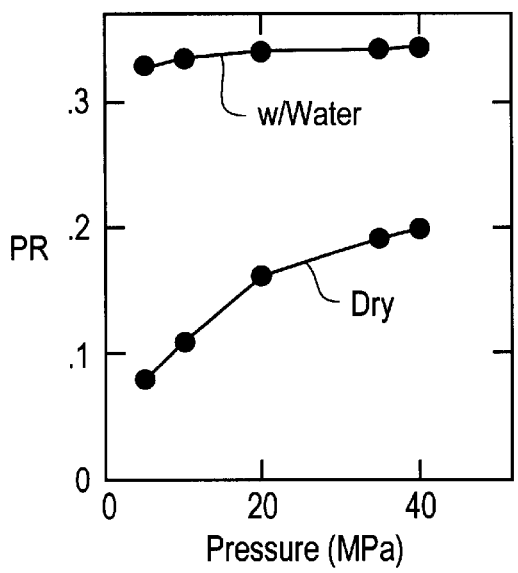
FIG. 17 is a cross-plot of Poisson's ratio in dry and water-saturated samples versus differential pressures for sandstone sample of FIG. 8h, calculated in accordance with the method of the present invention.

The simulated increase of the saturated-rock PR with increasing pore pressure (FIG. 14) has a physical basis. The higher the pore pressure is, the softer the rock is and the larger the relative increase in the bulk modulus between a dry and water-saturated sample. With the shear modulus being the same for the dry and saturated rock (see Gassmann reference stated above), Poisson's ratio is larger in the saturated sample than in the dry sample (FIG. 15), especially so in soft rock. An example of the saturated-rock PR increasing with decreasing differential pressure is given in FIG. 16. However, in some limited instances, the opposite effect may be observed as well (FIG. 17). The direction of the saturated-rock PR change depends on the porosity and elastic moduli of the sample and has to be tested by applying fluid substitution equations to the dry-rock data.

It should be noted that the effect of PR decreasing with decreasing differential pressure in rocks with gas and PR increasing with increasing differential pressure in rocks with liquid is expected to exist in consolidated sandstones, unconsolidated sands, and carbonates and dolomites with natural and stress-induced micro- and macro-cracks. The in-situ conditions amenable to the development of this effect are:

(a) transient (late-stage) overpressure mechanisms that are invoked when the pressure of the fluid in the rock mass is allowed to increase relative to hydrostatic through (1) aquathermal fluid expansion; (2) hydrocarbon source maturation and fluid expulsion; (3) clay diagenesis; (4) fluid pumping from deeper pressured intervals; and (5) decrease in overburden due to tectonic activity; and (b) pore pressure and/or differential pressure changes in the rock due to human activity—gas and/or liquid injection into reservoirs with accompanying pore pressure increase; gas and/or liquid withdrawal with accompanying pore pressure decrease; stress changes due to well drilling.

Note that injected fluids (gas and/or liquid) may include, but are not limited to (1) natural gas and $CO_2$ used for enhanced recovery; (2) water used for enhanced recovery; (3) excessive $CO_2$ sequestrated by injecting into the subsurface; (4) fluids with drill cuttings injected into the subsurface with the purpose of sequestration.

Referring back to FIG. 4, in accordance with the present invention, a method for overpressure detection in subsurface gas, liquid hydrocarbon, or water reservoirs from compressional- and shear-wave measurement data is described. As part of step 110, compressional- and shear-wave data are obtained from field measurements conducted on the particular subsurface formation F. The compressional- and shear-wave data can be obtained using well known geophysical measurement technology and methods, including for example, surface and marine (bottom cables) seismic reflection profiling, well log velocity measurements, cross-well measurements, vertical seismic profiling, and velocity measurements ahead of the drill bit. If necessary, the wave measurement data may be smoothed, normalized, and/or further processed to improve their accuracy and readability and thus, allow a better interpretation of the final wave measurement data.

As part of step 120, either the Poisson's ratio or the $V_p/V_s$ ratio is determined using the wave measurement data obtained in step 110. The Poisson's ratio is calculated according to Eqn. 2 above, while the $V_p/V_s$ ratio is simply the compressional-wave velocity ($V_p$) divided by shear-wave velocity ($V_s$). The Poisson's Ratio may also be determined independently of $V_p$ and $V_s$ by using well-known geophysical techniques such as the "Amplitude Versus Offset" (AVO) method or "Elastic Impedance" (EI) method.

Once the Poisson's ratio (or velocity ratio) is determined, an overpressure condition in the subsurface formation F is identified by comparing the field-based Poisson's ratio (determined in step 120) to a plurality of known (i.e., previously established) Poisson's ratios representative of the subsurface formation (including its characteristics such as porosity, clay content, gas- or water- or liquid hydrocarbon-saturated formation, etc.) and applying the PR—pore pressure $P_{pore}$ criterion that is applicable for that type of formation (i.e., a gas-saturated formation or a liquid hydrocarbon/water-saturated formation (steps 130 and 140 in FIG. 4)). The Poisson's ratio—pore pressure $P_{pore}$ criteria is presented below:

a) In gas-saturated overpressured compartments (that are part of formation F), the Poisson's ratio (or $V_p/V_s$ ratio) decreases with the increasing pore pressure.

b) For liquid hydrocarbon-saturated and water-saturated compartments (that are part of formation F), the Poisson's ratio (or $V_p/V_s$ ratio) increases with the increasing pore pressure.

It should be noted that values of Poisson's ratio for an array of differential pressures ranging from zero MPa to about 60 MPa have previously been determined and are known for various types of rock formations (e.g., Berea sandstone with 19% porosity). Examples of these known values of Poisson's ratio for various types of rock formations at a range of differential pressures are presented in FIGS. 8a–8l. Poisson's ratio values for other types of rock formations than those presented in FIGS. 8a–8l are well known to those skilled in the art of geophysical measurement.

Although determining only one single Poisson's ratio (or wave velocity ratio) value is sufficient to practice the method of this invention, it may be desirable to determine a plurality of Poisson's ratios (or wave velocity ratios) obtained from wave measurement data at differing differential pressure values for the subsurface formation F being investigated. Determining multiple PR (or $V_p/V_s$ ratio) values for the subsurface formation permits the identification of an overpressure condition by examining the slope of the Poisson's ratio vs. differential pressure (PR vs. $P_{differential}$) cross-plot directly without having to rely on previously gathered (i.e., external) PR vs. $P_{differential}$ data on the particular formation. A steep slope of the Poisson's ratio vs. differential pressure cross-plot indicates an overpressure condition in the formation. Using the $V_p/V_s$ ratio instead of Poisson's ratio in the above approach leads to the same overpressure condition indication.

Therefore, one can determine the existence of an overpressure condition (i.e., high pore pressure) in the compartment by comparing one or more values of the Poisson's ratio (or velocity ratio) determined from field-based measurement data against known Poisson's ratio (or $V_p/V_s$ ratio) values representative of the particular subsurface formation type and applying the PR (or $V_p/V_s$ ratio)—pore pressure criterion that is appropriate for that type of formation (i.e., gas-saturated or liquid hydrocarbon/water-saturated compartment).

Figure 18:
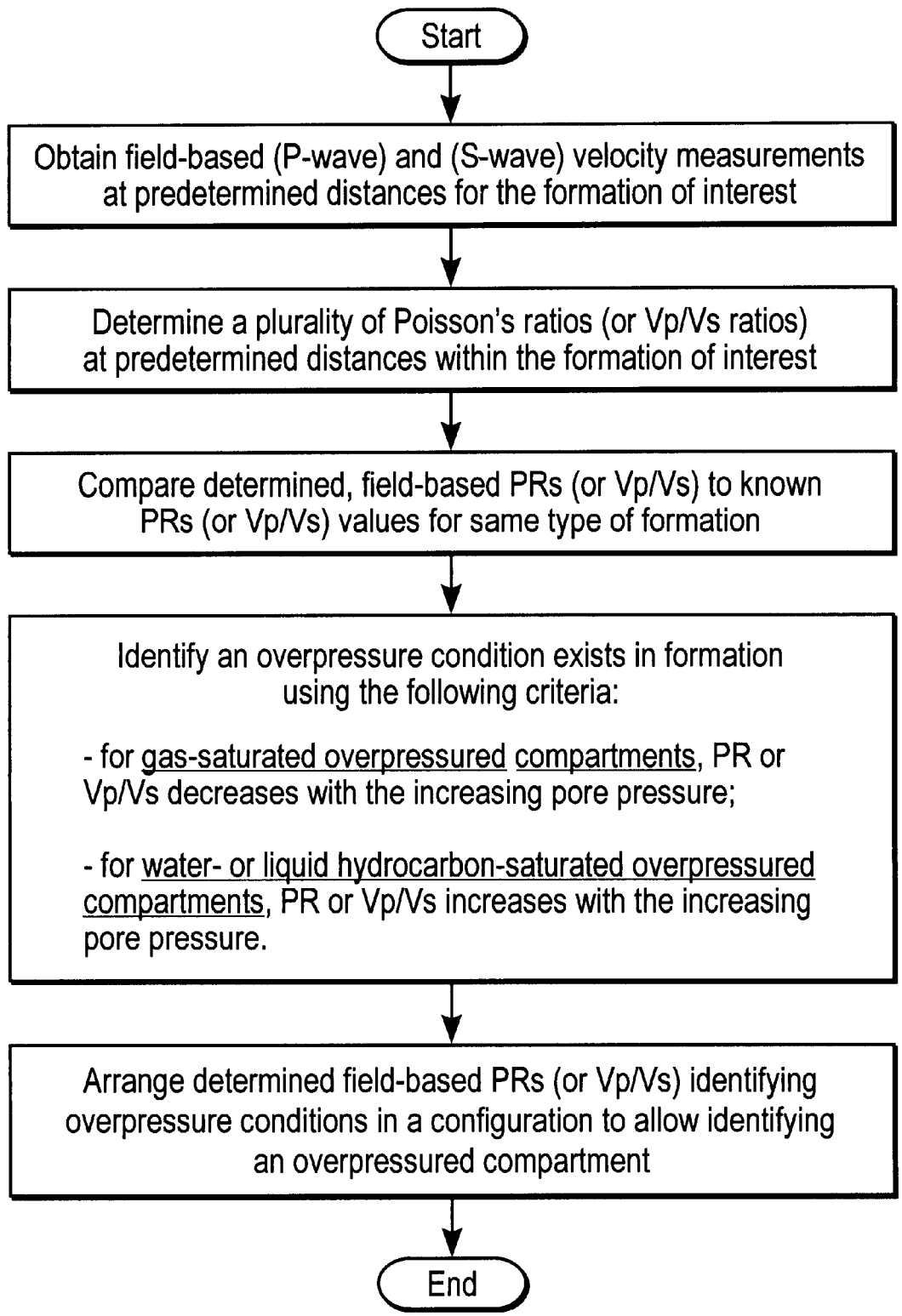
FIG. 18 illustrates a flow chart of a second embodiment of the present invention.

Another embodiment of the method of the present invention allows the identification and "mapping" of an overpressured compartment C that is part of formation F. Referring to FIG. 18, in accordance with the present invention, a method for overpressure detection in subsurface gas, liquid hydrocarbon, or water reservoirs from compressional- and shear-wave measurement data is described. As part of step 210, compressional- and shear-wave data are obtained from field measurements conducted on the particular subsurface formation F. It may be advantageous to have a plurality of field measurements conducted at predetermined distances (i.e., longitudinal-and latitudinal-known points) within the formation F of interest in a map-like fashion. Compressional- and shear-wave data can be obtained using well known geophysical measurement technology and methods, including for example, surface and marine (bottom cables) seismic reflection profiling, well log velocity measurements, cross-well measurements, vertical seismic profiling, and velocity measurements ahead of the drill bit. If necessary, the wave measurement data may be smoothed, normalized, and/or further processed to improve their accuracy and readability and thus, allow a better interpretation of the final wave measurement data.

As part of step 220, a plurality of Poisson's ratios or $V_p/V_s$ ratios is determined using the wave measurement data obtained in step 210. The Poisson's ratio is calculated according to Eqn. 2 above, while the $V_p/V_s$ ratio is simply the compressional-wave velocity ($V_p$) divided by shear-wave velocity ($V_s$).

Once the plurality of Poisson's ratios (or velocity ratios) is determined, those compartments C with abnormally high pore pressure (overpressure) are mapped in the subsurface formation F by assigning the location of field-based Poisson's ratios determined in step 220 to the location of abnormally low (for gas-saturated) or abnormally high (liquid hydrocarbon/water) Poisson's ratios (or velocity ratios) that had been previously determined and are known for the representative subsurface formation (steps 230, 240, and 250 in FIG. 18). Values of Poisson's ratio for an array of differential pressures ranging from zero MPa to about 60 MPa have previously been determined and are known for various types of rock formations (e.g., Berea sandstone with 19% porosity). Examples of these known values of Poisson's ratio for various types of rock formations at a range of differential pressures are presented in FIGS. 8a–8l. Poisson's ratio values for other types of rock formations than those presented in FIGS. 8a–8l are well known to those skilled in the art of geophysical measurement.

If desired, a graphical map representation may be generated following the assigning of the field-based Poisson's ratios (or $V_p/V_s$ ratios). However, it should be noted that "mapping the overpressured compartment" is not limited to only generating a graphical map (or representation) of those Poisson's ratios (or $V_p/V_s$ ratios) that are identified as indicative of an overpressure condition in the formation. Such "mapping" may include tabular representation as well as other visual (e.g., photograph) and audible (sound signal) representations of the overpressured compartment.

Thus a process for overpressure detection has been described. Although specific embodiments, including specific parameters, methods, and materials have been described, various modifications to the disclosed embodiments will be apparent to one skilled in the art upon reading this disclosure. Therefore, it is to be understood that such embodiments are merely illustrative of and not restrictive on the broad invention and that this invention is not limited to the specific embodiments shown and described.

What is claimed is:

1. A method for identifying an overpressure in a subsurface formation from a compressional-wave measurement and a shear-wave measurement in the subsurface formation, comprising the steps of:
   (a) determining a Poisson's ratio for the subsurface formation from the compressional-wave measurement and the shear-wave measurement; and
   (b) utilizing a comparison of the determined Poisson's ratio value with a plurality of known Poisson's ratio values representative of the subsurface formation to identify an overpressure in the subsurface formation.

2. A method for identifying an overpressure in a subsurface formation from compressional-wave and shear-wave data, comprising the steps of:
   (a) obtaining a compressional-wave velocity measurement and a shear-wave velocity measurement from the compressional-wave and shear-wave data for the subsurface formation;
   (b) determining a Poisson's ratio value for the subsurface formation from the compressional-wave velocity measurement and the shear-wave velocity measurement; and
   (c) utilizing a comparison of the determined Poisson's ratio value with a plurality of known Poisson's ratio values representative of the subsurface formation to identify an overpressure in the subsurface formation.

3. A method for identifying an overpressure in a subsurface formation from compressional-wave and shear-wave data, comprising the steps of:
   (a) obtaining a compressional-wave velocity measurement and a shear-wave velocity measurement from the compressional-wave and shear-wave data for the subsurface formation;
   (b) determining a $(V_p/V_s)$ value from the compressional-wave velocity measurement and a shear-wave velocity measurement; and
   (c) utilizing a comparison of the determined $(V_p/V_s)$ value with a plurality of known $(V_p/V_s)$ values representative of the subsurface formation to identify an overpressure in the subsurface formation.

4. A method for identifying an overpressure in a subsurface formation, comprising the steps of:
   (a) obtaining a plurality of compressional-wave velocity measurements and a plurality of shear-wave velocity measurements for a plurality of differential pressure values;
   (b) determining a plurality of Poisson's ratios for the subsurface formation from the plurality of compressional-wave velocity measurements and the plurality of shear-wave velocity measurements; and
   (c) identifying an overpressure in the subsurface formation by examining the plurality of Poisson's ratios.

5. A method for identifying an overpressure in a subsurface gas-saturated formation compartment from compressional-wave and shear-wave data, comprising the steps of:
   (a) obtaining a compressional-wave velocity measurement and a shear-wave velocity measurement from the subsurface gas-saturated formation compartment;
   (b) determining a Poisson's ratio value from the compressional-wave measurement and the shear-wave measurement, wherein the Poison's ratio is determined according to the following $$PR=0.5\{[(V_p/V_s)^2-2]/[(V_p/V_s)^2-1]\}$$

where
   PR=Poisson's ratio value;
   $V_p$=compressional-wave velocity;
   $V_s$=shear-wave velocity;
   (c) comparing the determined Poisson's ratio value to a plurality of known Poisson's ratio values, wherein the plurality of known Poisson's ratio values is representative of the subsurface gas-saturated formation; and
   (d) identifying an overpressure in the subsurface gas-saturated formation compartment when the determined Poisson's ratio value is lower than a pre-determined Poisson's ratio value in the plurality of known Poisson's ratio values.

6. A method for identifying an overpressure in a subsurface liquid-saturated formation compartment from compressional-wave and shear-wave data, comprising the steps of:
   (a) obtaining a compressional-wave velocity measurement and a shear-wave velocity measurement from the subsurface liquid-saturated formation compartment;
   (b) determining a Poisson's ratio value from the compressional-wave measurement and the shear-wave measurement, wherein the Poison's ratio is determined according to the following $$PR=0.5\{[(V_p/V_s)^2-2]/[(V_p/V_s)^2-1]\}$$

where
   PR=Poisson's ratio value,
   $V_p$=compressional-wave velocity, $V_s$=shear-wave velocity;

(c) comparing the determined Poisson's ratio value to a plurality of known Poisson's ratio values, wherein the plurality of known Poisson's ratio values is representative of the subsurface liquid-saturated formation; and (d) identifying an overpressure in the subsurface liquid-saturated formation compartment when the determined Poisson's ratio value is higher than a pre-determined Poisson's ratio value in the plurality of known Poisson's ratio values.

7. A method for identifying an overpressured compartment located within a subsurface formation, comprising the steps of:

(a) obtaining a plurality of compressional-wave velocity measurements and a plurality of shear-wave velocity measurements, wherein the plurality of compressional-wave velocity measurements and the plurality of shear-wave velocity measurements are performed at a plurality of predetermined locations within the subsurface formation; determining a plurality of Poisson's ratios at the plurality of predetermined locations for the subsurface formation from the plurality of compressional-wave velocity measurements and the plurality of shear-wave velocity measurements; and (b) identifying an overpressured compartment by examining the determined plurality of Poisson's ratios.

8. A method for monitoring a location of a fluid injected into a subsurface formation from a compressional-wave measurement and a shear-wave measurement in the subsurface formation, comprising the steps of:

(a) determining a Poisson's ratio for the subsurface formation from the compressional-wave measurement and the shear-wave measurement; and (b) utilizing a comparison of the determined Poisson's ratio value with a plurality of known Poisson's ratio values representative of the subsurface formation so as to monitor the location of the fluid injected in the subsurface formation.

9. The method of claim 8, wherein the fluid injected into the subsurface formation is selected from the group consisting of natural gas, carbon dioxide and water.

10. A method for monitoring a differential pressure change due to human activity in a subsurface formation from a compressional-wave measurement and a shear-wave measurement in the subsurface formation, comprising the steps of:

(a) determining a Poisson's ratio for the subsurface formation from the compressional-wave measurement and the shear-wave measurement; and (b) utilizing a comparison of the determined Poisson's ratio value with a plurality of known Poisson's ratio values representative of the subsurface formation so as to monitor the differential pressure change due to human activity in the subsurface formation.

11. A method for monitoring stress changes due to well drilling in a subsurface formation from a compressional-wave measurement and a shear-wave measurement in the subsurface formation, comprising the steps of:

(a) determining a Poisson's ratio for the subsurface formation from the compressional-wave measurement and the shear-wave measurement; and (b) utilizing a comparison of the determined Poisson's ratio value with a plurality of known Poisson's ratio values representative of the subsurface formation so as to monitor the stress changes due to well drilling in the subsurface formation.

12. A method for monitoring a location of a fluid withdrawn from a subsurface formation from a compressional-wave measurement and a shear-wave measurement in the subsurface formation, comprising the steps of:

(a) determining a Poisson's ratio for the subsurface formation from the compressional-wave measurement and the shear-wave measurement; and (b) utilizing a comparison of the determined Poisson's ratio value with a plurality of known Poisson's ratio values representative of the subsurface formation so as to monitor the location of the fluid withdrawn from the subsurface formation.

\* \* \* \* \*